(12) United States Patent
Costabeber

(10) Patent No.: US 11,980,512 B2
(45) Date of Patent: May 14, 2024

(54) METHOD AND SYSTEM FOR MAKING DENTAL PROSTHESES

(71) Applicant: DWS S.R.L., Thiene (IT)

(72) Inventor: Ettore Maurizio Costabeber, Zane (IT)

(73) Assignee: DWS S.R.L., Thiene (IT)

( * ) Notice: Subject to any disclaimer, the term of this patent is extended or adjusted under 35 U.S.C. 154(b) by 884 days.

(21) Appl. No.: 16/313,595

(22) PCT Filed: Jun. 30, 2016

(86) PCT No.: PCT/IT2016/000165
§ 371 (c)(1),
(2) Date: Dec. 27, 2018

(87) PCT Pub. No.: WO2018/002960
PCT Pub. Date: Jan. 4, 2018

(65) Prior Publication Data
US 2019/0314123 A1    Oct. 17, 2019

(51) Int. Cl.
*A61C 13/00*    (2006.01)
*A61C 9/00*    (2006.01)
(Continued)

(52) U.S. Cl.
CPC ........ *A61C 13/0013* (2013.01); *A61C 9/0046* (2013.01); *A61C 13/34* (2013.01);
(Continued)

(58) Field of Classification Search
CPC . A61C 13/34; A61C 13/0013; A61C 13/0003; A61C 9/0046; A61C 13/0018; A61C 13/09; A61C 13/0004
See application file for complete search history.

(56) References Cited

U.S. PATENT DOCUMENTS 6,322,728 B1 *  11/2001  Brodkin ................. A61K 6/802
                                                       264/603
2009/0130624 A1 *  5/2009  Sun ......................... A61F 5/566
                                                       433/48

FOREIGN PATENT DOCUMENTS

WO    WO 1997/29901        8/1997
WO    WO1997029901     *   8/1997
(Continued)

OTHER PUBLICATIONS

International Search Report related to PCT/2016/000165, dated Feb. 27, 2017 (5 pgs.).
(Continued)

*Primary Examiner* — Monica A Huson
*Assistant Examiner* — Kelsey C Grace
(74) *Attorney, Agent, or Firm* — Volpe Koenig

(57) ABSTRACT

Method for manufacturing dental prostheses, comprising the following operations: defining a layered numerical representation of a dental prosthesis (11); for a first layer of the numerical representation, prepare a corresponding layer of a light sensitive liquid substance (6); selectively solidify the layer of liquid substance (6) to obtain a first sheet (7) having a geometry corresponding to the geometry of the first layer of the numerical representation; repeat the operations of preparing a layer of liquid substance (6) and selectively solidify the layer of liquid substance (6) for each subsequent layer of the numerical representation to obtain corresponding sheets (7); cause the mutual adhesion between said sheets (7); modify the composition of the liquid substance (6) after having solidified one of the sheets (7) and before solidifying the subsequent sheet (7), so as to modify one or more optical properties of the liquid substance (6).

11 Claims, 3 Drawing Sheets

Figure 1:
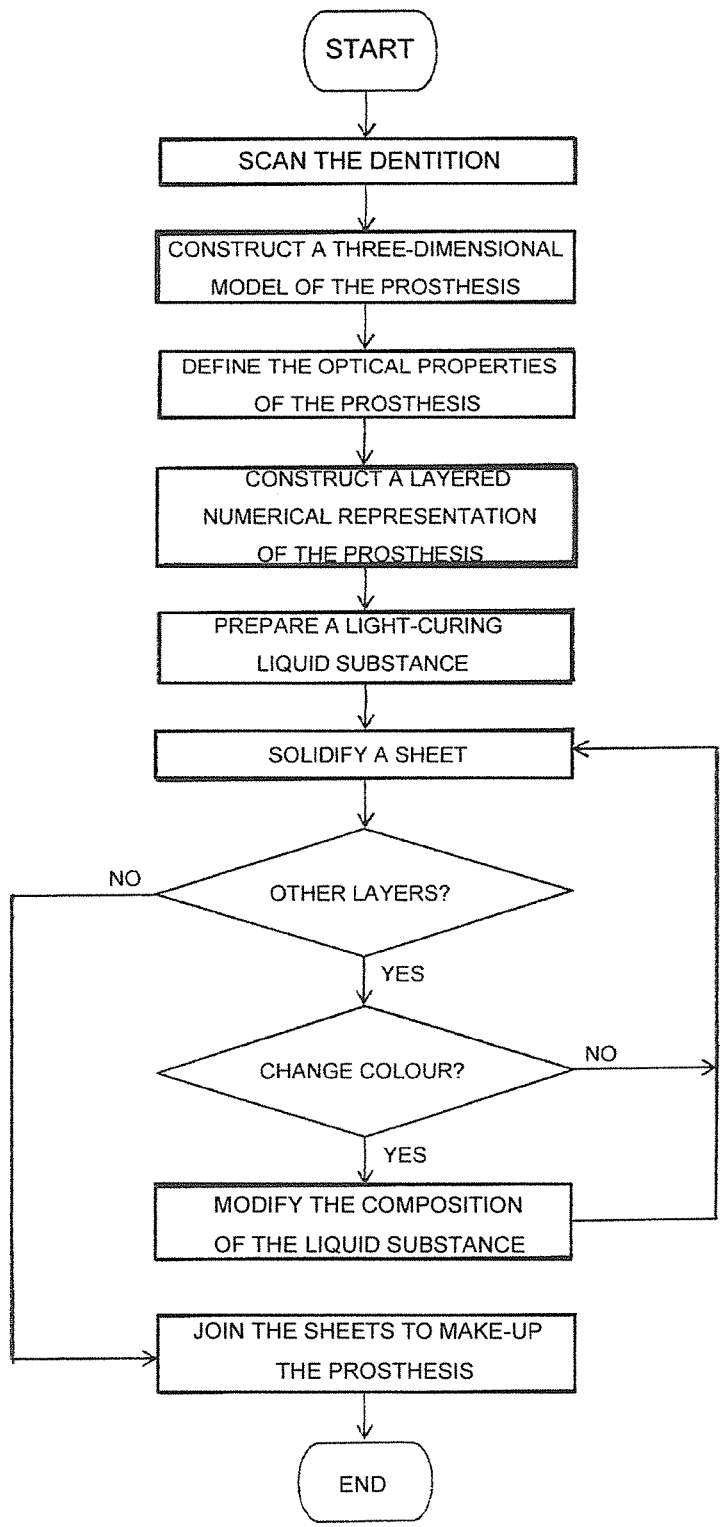

(51) Int. Cl.
*A61C 13/34* (2006.01)
*A61C 13/09* (2006.01)

(52) U.S. Cl.
CPC ...... *A61C 13/0004* (2013.01); *A61C 13/0018* (2013.01); *A61C 13/09* (2013.01)

(56) References Cited

FOREIGN PATENT DOCUMENTS

| | | |
|---|---|---|
| WO | WO 2001/12679 | 2/2001 |
| WO | WO 2009/154301 | 12/2009 |

OTHER PUBLICATIONS

Written Opinion of the International Searching Authority related to PCT/2016/000165, dated Feb. 27, 2017 (7 pgs.).

\* cited by examiner

METHOD AND SYSTEM FOR MAKING DENTAL PROSTHESES

The present invention relates to a method for manufacturing dental prostheses particularly suitable to create an implant crown to be coupled with an implant. The present invention also relates to a system for the application of the above method.

According to a known technique a dental prosthesis, and more specifically an implant crown, is produced by machine tooling a block of metal, ceramic, resin, zirconium dioxide, or other suitable materials, so as to reproduce the shape of the original tooth. Once this shape is obtained, the crown is covered by one or more layers of ceramic material so as to obtain a product which is aesthetically similar to a natural tooth.

The above described known technique poses the drawback that the dental prosthesis thus obtained has aesthetic differences compared to a natural tooth. In fact, a natural tooth has non-uniform optical properties, in particular variable from the tooth top (incisal region) to its neck (cervical region). Generally, this means that the tooth appears lighter near the top than near the neck. This feature is the result of the stratified conformation of the tooth, which results in different modes of reflection, refraction and absorption of light in the different areas of the tooth also depending on the direction of incidence of the light. Although the previously described known technique allows the selection of the starting material from a range of materials of different colours so as to obtain a prosthesis aesthetically similar to the natural teeth of each patient, the prostheses obtainable are in any case monochromatic, that is, devoid of those optical variations which are characteristic of a natural tooth.

A further drawback of the known technique described above is the fact that it requires several steps of processing, with a consequent increase in the production time.

Moreover, the presence of multiple processing steps leads to the further drawback of increasing the possibility of errors and, consequently, processing waste, having a negative impact on the average cost of prostheses.

The known technique described above poses the further drawback of bringing about a significant waste of material, which results in an increase in the production costs of each prosthesis.

A further drawback of the aforesaid known technique is the fact that the tools required for the machining of the prosthesis are subject to wear and, therefore, to progressive degradation of the machining precision. After a certain period of use, those tools must be replaced, with consequent costs.

In an attempt to at least partially address the drawbacks mentioned above, a variant of the aforementioned known technique involves the use of blocks consisting of multiple layers of different colours as a starting material.

This variant improves the aesthetic qualities of the prosthesis with respect to the previously described technique, however it poses the drawback of offering a limited number of shades and its gradations and, therefore, it does not allow the infinite variety of colours of natural teeth to be reproduced.

A further known technique for the production of dental prostheses, described in the Italian patent application VI2010A353 in the name of the applicant herein, provides for the use of an additive process, and more specifically a stereolithography process, rather than a material removal process as in the previous case.

Compared to the known technique and to its variant described above, this second known technique has the advantage of not requiring the use of tools subject to wear and does not result in the waste of material. However, this technique also has the drawback of providing monochrome prostheses.

In order to make the prosthesis more aesthetically similar to the patient's natural tooth, the prior art includes subjecting the prosthesis created by means of stereolithography to a further surface finishing treatment, in particular the manual application of lacquers and colorants.

It is understood that the above manual procedure entails similar disadvantages to those already mentioned in relation to the finish of the prostheses obtained with the previously described techniques.

The present invention aims to overcome all the drawbacks relating to the techniques for the production of dental prostheses of a known type described above.

In particular, it is the object of the invention to create a dental prosthesis with an aesthetic appearance closer to that of a natural tooth with respect to what can be obtained with the known techniques.

Furthermore, it is the object of the invention to enable the production of dental prostheses in a more flexible way than with known methods described above, that is, enabling the attainment of a larger number of different gradations.

A further object of this invention is to produce the prosthesis in a simpler and faster manner than that allowed by known techniques, for example in a single process and without the need for surface coatings.

The above objects are achieved by a method for manufacturing dental prostheses in accordance with the main claim.

Additional detailed features of the method of the invention are specified in the respective dependent claims.

Advantageously, the method of the invention enables dental prostheses to be produced more rapidly and more accurately than with known methods, by reducing the processing time and related costs.

Another advantage is that the method of the invention essentially does not entail a waste of material, thus limiting the cost of the latter.

Yet another advantage lies in that the method of the invention does not require the use of tools subject to wear, avoiding the progressive decline in the machining accuracy and the costs of replacing the tools.

Figure 2:
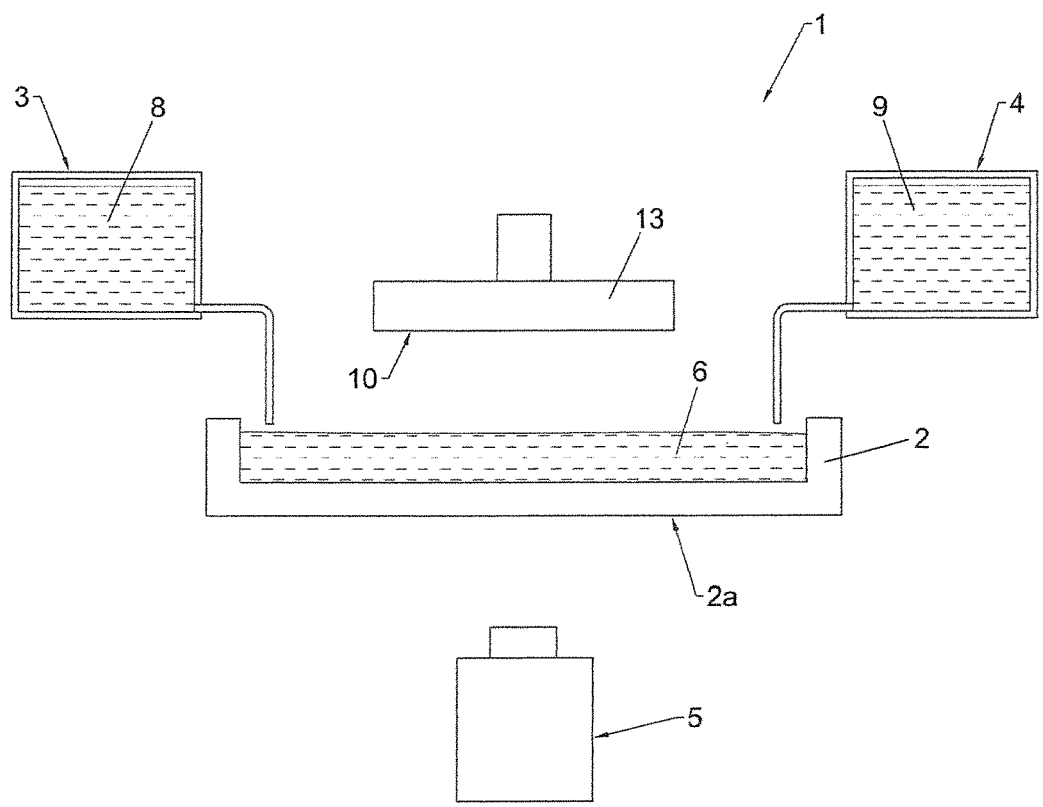
Figure 3:
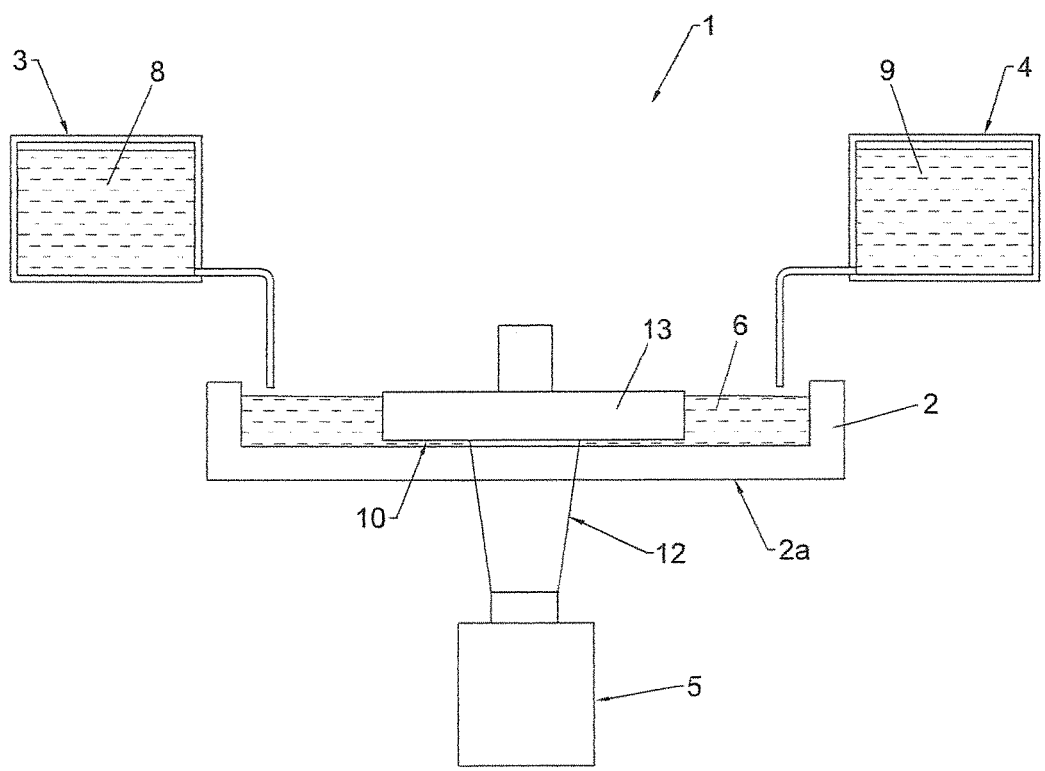
Figure 4:
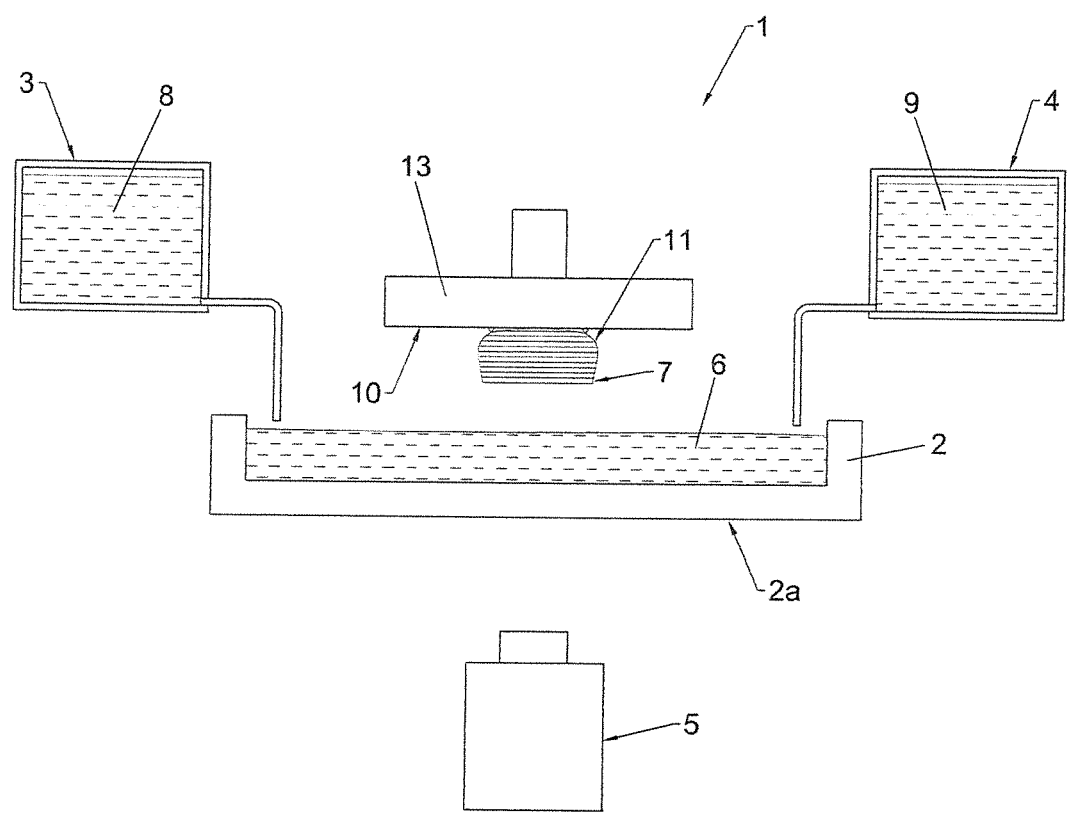
Figure 5:
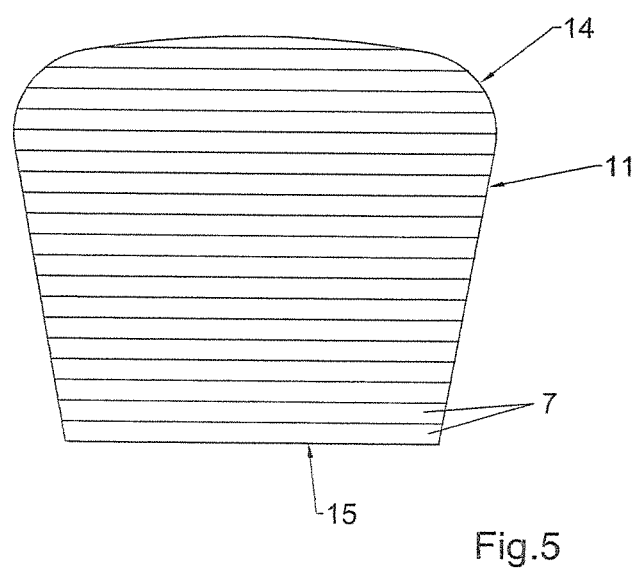

The above objects and advantages, together with others which will be mentioned below, will be highlighted in the following description of a preferred embodiment of the invention, which is given only by way of non-limiting example with reference to the enclosed drawings, where:

FIG. 1 is a block diagram of the method of the invention;

FIGS. 2 to 4 schematically represent the respective steps of the method in FIG. 1, applied on a stereolithography machine;

FIG. 5 schematically represents a dental prosthesis obtained with the method of the invention.

The method for producing the dental prostheses of the invention, represented schematically in FIG. 1, is particularly suitable to be implemented through the use of a stereolithography machine 1 of the type shown in FIGS. 2 to 4.

It should be noted henceforth that, in this application, the term "prosthesis" is used to indicate an element intended to replace a natural tooth or a part thereof, such as, for example, an implant crown to be associated with an implant.

FIG. 5 provides a simplified representation of a dental prosthesis 11, which extends between a top 14, corresponding to the incisal region intended to be directly exposed to mastication, and a neck 15, corresponding to the cervical region intended to be facing the gingiva.

The method of the invention provides first of all for the definition of a layered numerical representation of the dental prosthesis 11, as shown in FIG. 5. For clarity of representation, the figure shows a lesser number of layers than that used in reality. In fact, in the practical application of the method, there will be a greater number of layers, and they will be thinner than those shown in FIG. 5.

Preferably, the aforementioned numerical representation comprises a group of data representing the shape and possibly the thickness of each layer to be created, together with the position of the layers in the object.

Preferably, the aforementioned numerical representation is obtained from a three-dimensional numerical model of the dental prosthesis 11, obtainable for example by the processing of data received from an optical scanning device, such as an intraoral camera or other equivalent devices, not shown in the figures but known per se. The scanning device may be placed in the patient's mouth so as to detect the geometry of the tooth to be replaced with the prosthesis 11, and/or the adjacent teeth, and the data thus obtained can be processed using techniques known per se in order to obtain the aforementioned three-dimensional numerical model.

Alternatively, the three-dimensional numerical model may be obtained by scanning a physical model of the patient's dentition.

The three-dimensional numerical model is processed so as to generate a certain number of sections of the prosthesis 11 in parallel planes arranged in pre-established mutual distances, the sections corresponding to the layers of the numerical representation.

For each layer of the aforementioned numerical representation, the process involves selectively solidifying a light sensitive liquid substance, indicated in FIGS. 2-4 with reference number 6, so as to obtain a corresponding sheet 7 having a geometry which corresponds to the geometry of the layer to be reproduced.

It should be noted hereinafter that the adjective "light sensitive" used in this application refers to the property of a substance to solidify upon exposure to light radiation of a predefined frequency.

The sheets 7 obtained in this manner are then made to adhere so as to obtain the dental prosthesis 11, as seen in the aforementioned FIG. 5.

The invention aims to modify the composition of the liquid substance 6 after at least one of the sheets 7 is solidified and before solidifying the next sheet.

The composition is modified so as to change one or more optical properties of the liquid substance 6 and, therefore, of the resulting sheet.

Preferably, colour is included among the aforementioned optical properties. The optical properties may include transparency, reflectance, and other optical properties, in addition to or in place of colour.

It is understood that the method just described enables the attainment of a dental prosthesis 11 the surface optical properties of which vary in a gradual manner in a direction perpendicular to the plane of the sheets 7.

Furthermore, since the variation of the optical properties can be controlled layer by layer by varying the composition of the liquid substance 6, it is understood that the aforementioned method enables the creation of a dental prosthesis 11 the surface optical properties of which are similar to those of the patient's natural tooth in a more precise manner than what can be obtained with the known techniques described above, so as to achieve one of the objects of the invention.

It is also understood that the aforementioned method enables the creation of a prosthesis 11 with a single process and without the need for surface coatings, thus achieving a further object of the invention.

Preferably, the liquid substance 6 comprises a first light sensitive material suited to polymerize upon exposure to a predefined light radiation, even more preferably of the type suited to be polymerized by irradiation with a UV beam. Preferably, the first light sensitive material is in liquid or pasty form and the aforementioned polymerization causes its solidification. Materials based on acrylate or methacrylate have proven particularly suitable for use as light sensitive materials in the production of dental prostheses.

Preferably, to modify the composition of the liquid substance 6 one or more modifier materials with optical properties different from the optical properties of the first light sensitive material are added. Obviously, the modifier materials are compatible with the first light sensitive material in such a way that their being mixed with the latter does not affect the light sensitive properties of the mixture, or they change it in a negligible manner with regard to the final dental prosthesis 11.

The aforementioned modifier materials may include a dye, which is added to the liquid substance 6 to modify the shade of the latter. Obviously, multiple different dyes may be used, alternatively or in combination among them, so as to obtain a prosthesis 11 with a colour and shade as close as possible to those of the natural tooth.

Alternatively to the dye, or in combination with it, one or more further light sensitive materials can be used provided that they are suited to polymerize upon exposure to the aforementioned light radiation and are of different colours from that of the first light sensitive material. The same considerations made above for the first light sensitive material apply in the case of the aforementioned additional light sensitive materials. Advantageously, the mixing of these additional light sensitive materials with the first light sensitive material enables a homogeneous mixture to be obtained with light sensitive properties that are not affected by the mixing ratio.

As an alternative to those described above or in addition to them, at least partially transparent modifier materials may be used, for example glass or other similar materials, which allow the transparency and/or the reflectance of the liquid substance 6 to be modified and, as a result, the sheets 7 obtained from it.

Alternatively to the previous modifier materials or in addition to them reflective materials may be used, such as titanium oxide, aluminium oxide, zirconium oxide, silicon oxide, and the like.

Preferably, the aforementioned at least partially transparent and/or reflective materials are in the form of powder.

Preferably, the method provides for a mixing operation of one or more of the above modifier materials with the liquid substance 6, so as to confer a homogeneous composition to the latter. The aforesaid mixing can take place in a container 2, shown in FIGS. 2-4, in which the different components are supplied separately by means of respective delivery ducts pertaining to the respective tanks. To this end, a mixing device positioned in the container 2 may be provided for.

Alternatively or in addition to what has just been described, the mixing can take place at the same time as the provision of the components of the mixture. This may be achieved for example by making the ducts that deliver the different components of the mixture to the container 2 flow together into a single dispensing outlet, so that the mixing takes place directly during the dispensing phase.

Preferably, for each numerical representation layer corresponding representative numerical values of the above mentioned optical properties of the layer are defined. Moreover, the change of the composition of the liquid substance 6 is carried out so that, for each layer, the optical properties of the liquid substance 6 correspond to the aforementioned numerical values relating to that layer. In this way it is possible to determine in advance the optical properties to be obtained for the dental prosthesis 11 then use them in the production phase to control the composition of the liquid substance 6 with precision.

The definition of these numerical values is carried out preferably in a preliminary operation to measure the optical properties on the surface of a reference tooth of a patient for whom the prosthesis 11 is intended. In particular, the representative numerical values of the optical properties of the various layers are calculated so as to approximate the above measured optical properties.

The above calculation can be done for example by averaging, perhaps weighted, the optical properties measured on the tooth points corresponding to a respective sheet 7 of the prosthesis 11.

Alternatively, it is possible to calculate the aforementioned numerical values on the basis of the optical properties measured on a surface line of the tooth that extends from the top to the neck.

Preferably, the composition of the liquid substance 6 is modified several times during the creation of the prosthesis 11, so as to obtain a plurality of sheets 7 which have optical properties different from each other, depending on the mode of variation of the measured optical properties. More specifically, the composition is modified after each individual sheet 7 of the aforesaid plurality of sheets 7 is solidified.

Some optical properties of a natural tooth vary gradually progressing from the top (incisal region) to the neck (cervical region). With the method of the present invention, this effect can be reproduced in the dental prosthesis 11 creating the various sheets 7 in sequence, starting from the one corresponding to one end of the tooth and proceeding towards the opposite end, gradually adding suitable amounts of the modifier materials to the liquid substance 6 in such a way that the percentage of the latter in the liquid substance 6 increases gradually.

For example, a natural tooth typically has a lighter colour at the top and gradually becomes darker proceeding towards the neck.

To reproduce this effect, the liquid substance 6 can be a mixture of a first light sensitive material of a lighter colour suited to polymerize upon exposure to a predefined light radiation, and of one or more modifier materials, with a colour darker than the last. In particular, the method provides for the preparation of the liquid substance 6 to be used to create the sheet 7 corresponding to the top 14 of the prosthesis 11 using the first light sensitive material, optionally in a mixture with one or more modifier materials in order to obtain a liquid substance 6 with a colour corresponding to that of the top 14 of the prosthesis 11. The subsequent sheets 7 will be created by adding one or more modifier materials to the remaining liquid substance 6 in order to obtain a darker shade, corresponding to that of the subsequent sheet, or sheets. The process continues in the above manner, gradually adding one or more modifier materials, until all the sheets 7 of the dental prosthesis 11 are created. Advantageously, proceeding as just described it is possible to minimize the amount of mixture components dispensed before solidifying each sheet 7, thereby reducing the mixing time and, therefore, the processing time. Furthermore, the reduced amount of components dispensed enables the mixing operations required to obtain a uniform shade in the liquid substance 6 to be limited.

If a second light sensitive material suited to polymerize after exposure to the aforementioned predefined light radiation and with a darker colour than the first light sensitive material is used as a modifier material 9, the liquid substance 6 of the last sheet 7 may also be made up of, for the most part, or even entirely, the second light sensitive material.

The considerations set out above are valid for both the first light sensitive material and the second light sensitive material.

The hitherto described method is particularly suitable to be conducted through the use of a stereolithography technique, as shown in FIGS. 2-4.

As is known, stereolithography provides for the arrangement of a layer of light sensitive liquid substance 6 for each layer of the numerical representation, in this case the dental prosthesis 11, and to cause the selective solidification of that layer of liquid substance 6 in the areas corresponding to the layer of the numerical representation by irradiation with a beam of light 12, preferably ultraviolet, to obtain a corresponding sheet 7, as shown in FIG. 3.

The light beam 12 may be smaller than the work area, for example it can be a laser beam which is able to solidify a limited area of the layer of liquid substance 6. In this case, there is a control device that progressively guides the beam towards all the points of the layer of liquid substance 6. The control device may comprise a series of mirrors, or a moving device on which the source of the beam is mounted and configured to move the source on a plane parallel to the layer of liquid substance 6, or the like. In any case, the solidification of the layer of liquid substance 6 takes place in a progressive manner, by moving the light beam 12 so as to cover all areas of the layer of liquid substance 6 to be solidified.

In the embodiment shown in FIGS. 2-4, the light beam 12 has dimensions at least equal to the area of solidification, in order to simultaneously solidify the entire work area of the layer of liquid substance 6. In this case a selection device is provided for, not shown in the figures but known per se, configured to inhibit the part of the light beam 12 corresponding to the areas of the layer of liquid substance 6 which do not require solidification. The selection device may comprise an array of micromirrors, a masking device, or the like.

The sheets 7 are created in the same sequence as the numerical representation layers. In particular, the first sheet 7 is solidified in contact with a support surface 10 pertaining to a modelling plate 13, to which it adheres. Similarly, each subsequent sheet 7 is solidified in contact with the prior sheet 7, to which it adheres. In this way, the adhesion of each sheet 7 to the prior sheet occurs simultaneously with the solidification of the sheet itself.

Preferably, the liquid substance 6 is placed in a container 2, as shown in FIG. 2.

The container 2 is filled with liquid substance 6 so that the level of the latter is at least equal to and preferably greater than the thickness of the sheet 7 to be created.

The layer of liquid substance 6 which is solidified to obtain a corresponding sheet 7 may be the one in contact with the bottom 2a of the container 2, or the one adjacent to the free surface of the liquid substance 6.

In the first case, shown in FIGS. 2-4, the bottom 2a of the container 2 is transparent to the light beam 12. In this case the modelling plate 13 is moved so that the last sheet 7 solidified or, failing that, the support surface 10 of the modelling plate 13, is at a distance from the transparent bottom 2a equal to the thickness of the sheet 7 to be created, as is observed in FIG. 3. Thus the light beam 12 is emitted from below and passes through the transparent bottom 2a so as to affect the layer of liquid substance 6 interposed between the transparent bottom 2a and the support surface 10, in the case of the first sheet, or between the transparent bottom 2a and the surface of the previous sheet 7, in the case of subsequent sheets, so as to solidify it. Subsequently, the modelling plate 13 is raised so as to separate the sheet 7 from the transparent bottom 2a, and the cycle is repeated for a further sheet 7. Thus the prosthesis 11 is formed below the modelling plate 13. FIG. 4 shows a portion of a prosthesis 11 made by means of the process just described, comprising a plurality of sheets 7.

According to an embodiment not shown in the figures, the layer of liquid substance 6 that is solidified is adjacent to the surface of the liquid substance 6 in the container 2. In this case, the operations are similar to those described in the previous case, except that the light beam 12 comes from above, each sheet 7 is formed above the previous sheet 7 and above the modelling plate 13, and the definition of each layer of the liquid substance 6 takes place by lowering the modelling plate so as to make the upper surface available or, failing that, the previously solidified sheet, at a depth equal to the thickness of the sheet to be created below the surface of the liquid substance 6.

It is understood that the method of the invention is applicable to both embodiments just described.

Preferably, the first sheet 7 to be solidified, located closest to the support surface 10 of the modelling plate 13, is that corresponding to the top 14 of the prosthesis 11. This prevents geometric irregularities on the neck 15 resulting from contact with the support surface 10, which could compromise the quality of the coupling of the neck to the implant. The aforementioned geometric irregularities can result, for example, either from surface micro-cracks of the prosthesis 11 in the process of detachment from the support surface 10, or from the presence, between the aforementioned support surface 10 and the first sheet 7, of spacer elements, obtained in the sphere of the same stereolithography procedure used to create the prosthesis 11, which are generally provided for in order to support the protruding parts of the prosthesis 11 during its construction and to facilitate the detachment of the prosthesis itself from the support surface 10. The construction of the prosthesis 11 starting from its top 14 requires that the neck 15 corresponds to the free end of the prosthesis 11 and can therefore be produced with higher geometric precision.

It is obvious that, in embodiments of the invention, the construction of the prosthesis 11 could also start from the sheet 7 corresponding to the neck 15. In this case, surface finishing subsequent to the detachment of the prosthesis 11 from the support surface 10 of the modelling plate 13 may be used.

The method of the invention described above is particularly suited to be applied in an integrated system for the creation of dental prostheses by means of stereolithography.

The aforementioned system comprises an optical device for the detection of one or more optical properties of a tooth, not shown in the figures but known per se; a computer, also not shown in the figures but known per se, which receives the data detected by the optical device and combines them with the layered numerical representation of the dental prosthesis 11 so as to connect a value representative of each optical property to each layer; and a stereolithography machine 1 controlled by the computer and shown in FIGS. 2-4.

If necessary, the aforementioned detection of the optical properties of the tooth may take place simultaneously with the acquisition of the geometry of the tooth itself. In this case, the aforementioned optical device may coincide with the scanning device mentioned earlier.

The stereolithography machine 1 comprises the aforementioned container 2 to contain the liquid substance 6 and an irradiation device 5 suited to cause the selective solidification of the first light sensitive material when it is present in the container 2.

The irradiation device 5 may comprise a laser source, possibly combined with a system of mirror deflectors. According to another embodiment, the irradiation device 5 may comprise a digital micromirror device (DMD), a selective masking device, or any other device equivalent to them.

The stereolithography machine 1 also comprises a first tank 3 in communication with the container 2, in which the first light sensitive material 8 is stored, and one or more second tanks 4 which are also in communication with the container 2, and contain the corresponding modifier materials 9.

There is also a feeding device for the selective and controlled outflow of the first light sensitive material 8 and/or of one or more modifier materials 9 toward the container 2. The feeding device, not shown in the figures, may comprise a pumping device, one or more shut-off valves, and/or any device suited to cause the aforementioned selective outflow.

The computer is configured to control the feeding device based on the values of the optical properties for any of the numerical representation layers, so as to adjust the composition of the liquid substance 6 present in the container 2 to the optical properties required for each sheet 7.

According to another embodiment not shown in the figures, the container 2 and the tanks are constructed in a single body, so as to define a cartridge as a whole. The cartridge comprises removable connection elements to a housing pertaining to the stereolithography machine 1.

Advantageously, the use of the aforesaid cartridge facilitates the use of the system, as it prevents the user from having to choose the components to be used every time, offering those combinations already tested.

Obviously different types of cartridge can be constructed, which differ as a result of the various combinations of components to be mixed so as to obtain the liquid substance 6.

Advantageously, the aforesaid different types of cartridge enable the expansion of the field of optical properties obtainable for the dental prosthesis 11. In particular, the user can choose the type of cartridge that enables the attainment of a prosthesis 11 with an appearance more closely resembling the appearance of the teeth of each individual patient.

Given the above, it is understood that the method and the system described above achieve all the preset objects.

In particular, the possibility of controlling the optical properties of each layer of the dental prosthesis enables the production of prostheses with an aesthetic appearance closer to that of a natural tooth.

Furthermore, the aforementioned possibility enables the attainment of a potentially infinite number of gradations of the materials used, simply by combining them in different proportions.

In addition, the prosthesis is obtained in a single process, therefore in a particularly simple and rapid manner, without the need for surface coatings.

The invention claimed is:

1. A stereolithography method for manufacturing dental prostheses, comprising the following operations:
    define a layered numerical representation of a dental prosthesis, wherein said dental prosthesis is provided with a first end adapted to be arranged towards a gingiva of a patient and a second end, opposite to the first one,
    define, for each layer of said numerical representation, corresponding numerical values representative of one or more optical properties of said layer,
    for a first layer of said numerical representation, prepare a corresponding layer of a light sensitive liquid substance suited to polymerize upon exposure to a predefined light radiation;
    selectively solidify said layer of liquid substance in the areas corresponding to said layer of said numerical representation by irradiation with a beam of light to obtain a first sheet having a geometry which corresponds to the geometry of said first layer of said numerical representation;
    repeat the operations to prepare a layer of liquid substance and to selectively solidify said layer of liquid substance for each subsequent layer of said numerical representation to obtain corresponding sheets;
    cause the mutual adhesion between said sheets;
    wherein said liquid substance comprises a first light sensitive material suited to polymerize upon exposure to a predefined light radiation;
    wherein the method comprises a further operation of modifying the composition of said liquid substance after having solidified one of said sheets and before solidifying the subsequent sheet, by adding one or more modifier materials to said liquid substance having optical properties different from the optical properties of said first light sensitive material, so as to modify one or more optical properties of said liquid substance, wherein said operation of modifying said liquid substance is carried out so that the optical properties of said liquid substance for each layer correspond to said numerical values corresponding to said layer;
    wherein said first sheet corresponds to said second end of said dental prosthesis.

2. The method according to claim 1, wherein said optical properties comprise one or more properties including color, transparency and reflectance.

3. The method according to claim 1, wherein said modifier materials (9) comprise a dye.

4. The method according to claim 1, wherein said modifier materials comprise a second light sensitive material suited to polymerize after exposure to said predefined light radiation and having a color different from that of said first light sensitive material.

5. The method according to claim 1, wherein said modifier materials comprise an at least partially transparent material.

6. The method according to claim 1, wherein the method further comprises an operation of mixing said modifier materials with said liquid substance.

7. The method according to claim 1, wherein the method further comprises an operation of measuring said one or more optical properties on the surface of a reference tooth and in that said numerical values are defined so as to approximate the measured optical properties.

8. The method according to claim 1, wherein said operation to modify the composition of said liquid substance is repeated after having solidified each sheet of a plurality of said sheets.

9. The method according to claim 1, wherein each of said sheets is solidified in contact with the previous sheet or, failing that, with a support surface.

10. The method according to claim 9, wherein the operation of solidifying each sheet is preceded by an operation to move the last sheet solidified or, failing that, said support surface, so as to place it at a distance from a surface of said liquid substance equal to the thickness of the sheet to be solidified.

11. The method according to claim 1, wherein each operation of preparing each layer of liquid substance comprises the operation of filling a container with said first light sensitive material so as to reach a filling level greater than the thickness of the corresponding sheet.

* * * * *